US008682241B2

(12) United States Patent
Huerta

(10) Patent No.: US 8,682,241 B2
(45) Date of Patent: Mar. 25, 2014

(54) METHOD AND SYSTEM FOR IMPROVING THE QUALITY OF TEACHING THROUGH ANALYSIS USING A VIRTUAL TEACHING DEVICE

(75) Inventor: Juan Manuel Huerta, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/464,421

(22) Filed: May 12, 2009

(65) Prior Publication Data

US 2010/0291528 A1      Nov. 18, 2010

(51) Int. Cl.
*G09B 7/00* (2006.01)
*G09B 25/00* (2006.01)

(52) U.S. Cl.
USPC ............................................ 434/362; 434/365

(58) Field of Classification Search
USPC ......... 434/118, 319, 320, 350–353, 365, 367; 704/200, 203, 216, 231, 3, 9, 206, 237, 704/251
See application file for complete search history.

(56) References Cited

U.S. PATENT DOCUMENTS

| | | | |
|---|---|---|---|
| 5,634,086 A * | 5/1997 | Rtischev et al. | 704/270 |
| 5,810,599 A * | 9/1998 | Bishop | 434/157 |
| 5,887,120 A * | 3/1999 | Wical | 706/46 |
| 6,146,148 A | 11/2000 | Stuppy | |
| 6,554,618 B1 | 4/2003 | Lockwood | |
| 6,556,970 B1 * | 4/2003 | Sasaki et al. | 704/257 |
| 6,795,684 B2 | 9/2004 | Stuppy | |
| 6,962,495 B2 | 11/2005 | Bajer et al. | |
| 2003/0232314 A1 | 12/2003 | Stout et al. | |
| 2004/0072136 A1 | 4/2004 | Roschelle et al. | |
| 2004/0193409 A1 * | 9/2004 | Hansen et al. | 704/215 |
| 2004/0197750 A1 | 10/2004 | Donaher et al. | |
| 2005/0021324 A1 * | 1/2005 | Brants et al. | 704/9 |
| 2005/0053908 A1 * | 3/2005 | Satheesh et al. | 434/350 |
| 2005/0214731 A1 | 9/2005 | Smith | |
| 2006/0141430 A1 | 6/2006 | Hutchinson et al. | |
| 2006/0166174 A1 | 7/2006 | Rowe et al. | |
| 2006/0228692 A1 * | 10/2006 | Seshadri | 434/365 |
| 2007/0099163 A1 | 5/2007 | Tseng | |

(Continued)

OTHER PUBLICATIONS

Jain et al., Boimetric_Behavioral_Traits, IEICE Transaction Fundamentals, vol. E00-A, No. 1 Jan. 2001.*

(Continued)

*Primary Examiner* — Robert J Utama
*Assistant Examiner* — Sadaruz Zaman
(74) *Attorney, Agent, or Firm* — Tutunjian & Bitetto, P.C.; Anne V. Dougherty

(57) ABSTRACT

A learning support method and system for a classroom includes a monitoring device configured to capture real-time participant events and stimuli in a learning environment. The participant events include classroom and collaboration-oriented input. A database is configured to store and organize a-priori skills of a typical student and a-priori knowledge a participating student. A set of cognitive model profiles are stored in system memory representing typical student behaviors and participant student behaviors with access to the captured participant events, the stimuli and the a-priori knowledge and skills. An interaction manager is configured to be responsive to the participant events and stimuli to perform interactive tasks during a class session. The interactive tasks may include posing a question, supplementing a lecture, tracking progress and rating teacher performance.

15 Claims, 5 Drawing Sheets

(56) References Cited

U.S. PATENT DOCUMENTS

2007/0212673 A1* 9/2007 King .............................. 434/350
2008/0014569 A1 1/2008 Holiday et al.
2008/0254434 A1* 10/2008 Calvert ......................... 434/350
2009/0202971 A1* 8/2009 Cortez .......................... 434/350

OTHER PUBLICATIONS

Huerta et al., "Teaching Buddy: Speech and Language Technologies", Nov. 6-7, 2008, The Proceedings of the 7th European Conference on e_Learning, Cyprus vol. 1, pp. 505-514.*
Matsuda, Noboru, et al. Evaluating a Simulated Student Using Real Students Data for Training and Testing. Proceedings of the International Conference on User Modeling. Aug. 2007. pp. 1-10.
Moir, Ellen, et al. The New Teacher Center. Continuum of Teacher Development. New Teacher Center. Formative Assessment System. 2004. http://newteachercenter.org/ti_continuum_of_teacher.php (16 pages).
Vanlehn, Kurt, et al. Applications of Simulated Students: An Exploration. Journal of Artificial Intelligence in Education. vol. 5, Issue 2. Dec. 1993. pp. 1-42.
Virvou, Maria, et al. A Simulated Student-Player in Support of the Authoring Process in Knowledge-Based Authoring Tool for Education Games. 2003 IEEE. Proceedings of the 3rd IEEE International Conference on Advanced Learning Technologies. Jul. 2003. (2 pages).
Vizcaino, Aurora, et al. Using a Simulated Student to Repair Difficulties in Collaborative Learning. 2002 IEEE. Proceedings of the International Conference on Computers in Education. Dec. 2002. (5 pages).
Adya, M., et al. Bringing Global Sourcing Into the Classroom: Experiential Learning Via Software Development Project. Proceedings of the 2007 ACM SIGMIS CPR Conference on Computer Personnel Research. Apr. 2007. pp. 20-27.
Craig, M. Facilitated Student Discussions for Evaluating Teaching. Technical Symposium on Computer Science Education. Mar. 2007. pp. 190-194.
Cushing, J., et al, Towards Best Practices in Software Teamwork. Fifth Annual Conference of the Northwestern Region. Consortium for Computing Sciences in Colleges. Oct. 2003. pp. 72-81.
Johnson, P., et al. Practical Automated Process and Product Metric Collection and Analysis in a Classroom Setting: Lessons Learned From Hackystat-UH. 2004 IEEE. Proceedings of the 2004 International Symposium on Empirical Software Engineering. Aug. 2004. (9 pages).
Huerta, J., et al. "The Teaching Buddy: Speech and Language Technologies for Assisting and Assessing Instructional Practice" 8th European Conference on e-Learning. Nov. 2008. pp. 507-515.
Office Action dated Aug. 20, 2013 for U.S. Appl. No. 13/494,491.

* cited by examiner

METHOD AND SYSTEM FOR IMPROVING THE QUALITY OF TEACHING THROUGH ANALYSIS USING A VIRTUAL TEACHING DEVICE

BACKGROUND

1. Technical Field

The present invention relates generally to teaching and classroom technologies and more particularly to systems and methods for providing feedback to and about teachers regarding the quality of their teaching and enhancing a classroom experience.

2. Description of the Related Art

There is substantial interest and activity in the educational professional development community towards developing effective assessment methods and tools in support of a broader effort for classroom instructional practice evaluation. As a result of this interest and the associated efforts, there exists today a large array of frameworks, tools and practices for observation-based instruction assessment. Among the basic questions that these frameworks help in answering includes what level of performance best matches a specific practitioner's performance in a specific area according to some observed evidence. Another question includes the areas of instructional strength and focus of the practitioner. Thus, to address these questions, a key component of these assessment practices is the direct observation of instruction by peers, auditors, and coaches, often relying on manual tools and processes which by nature, produce broad and subjective measurements. There is a the need for tools and technologies in support of these processes that make assessment efficient, replicable, unobtrusive, objective, and affordable while providing consistent measurements and constructive insights into teachers' practices.

SUMMARY

Advances in technologies that allow the capture and automatic audio transcription as well as great leaps in pattern recognition and data mining algorithms for analysis of structured and unstructured data provide a wide range of options that can be used as components in support of instructional assessment tools and solutions. Specifically, these technologies permit the automation of tasks like transcription, diarization and summarization of conversational speech. Altogether, technologies of this nature can be employed for observation-based instruction assessment tools that have desired features such as efficiency, objectivity and replicability. Language processing technologies may be employed in classroom-centered and education-oriented applications supporting systems for accessibility in the classroom and content management.

In accordance with present principles, automatic speech recognition (ASR) and natural language understanding (NLU) technologies may be implemented in instructional assessment or professional development tools. In one embodiment, a system referred to as a "Teaching Buddy", synergistically merges state of the art language and speech processing technologies with existing best-of-breed standards and framework based approaches currently used for teaching assessment. In terms of analysis and assessment frameworks, the Teaching Buddy is capable of leveraging and implementing various existing best practice assessment frameworks. The Teaching Buddy may be a stand alone assessment instrument or can be a tool that facilitates and deepens the dialog between teachers and their mentors: i.e., to be a tool that supports a community of practice. By providing a set of objective and meaningful measurements, it can help reach deeper analytical insight into instructional practice and identify and measure goals, areas of focus and growth.

In one embodiment, the Teaching Buddy integrates components from the University of California Santa Cruz New Teacher Center's Continuum of Teacher Development which form part of a Formative Assessment System (*Continuum of Teacher Development*, New Teacher Center, University of California, Santa Cruz, 2005, hereinafter "the Continuum"). The Continuum provides underlying goals, and philosophy. The present embodiments' Teaching Buddy provides a common framework for dialog and mentoring. The Teaching Buddy can help the professional development team to be more efficient and deep in its use of frameworks like the Continuum.

A learning support method and system for a classroom includes a monitoring device configured to capture real-time participant events and stimuli in a learning environment. The participant events include classroom and collaboration-oriented input. A database is configured to store and organize a-priori skills of a typical student and a-priori knowledge a participating student. A set of cognitive model profiles are stored in system memory representing typical student behaviors and participant student behaviors with access to the captured participant events, the stimuli and the a-priori knowledge and skills. An interaction manager is configured to be responsive to the participant events and stimuli to perform interactive tasks during a class session. The interactive tasks may include posing a question, supplementing a lecture, tracking progress and rating teacher performance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
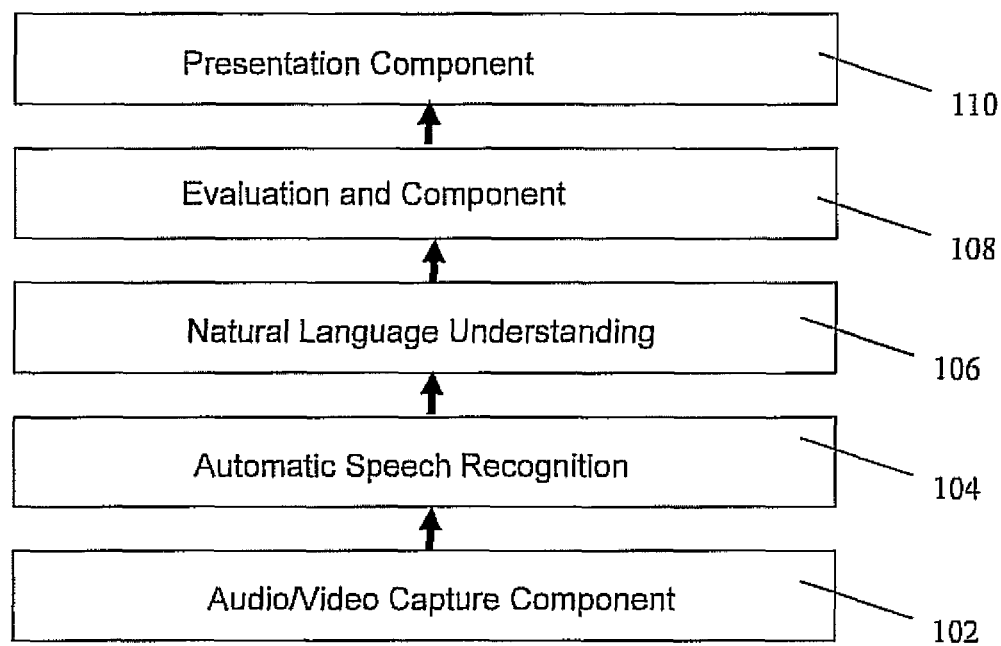
FIG. 1 is a block/flow diagram showing a system/method for analyzing a classroom environment in accordance with the present principles.

The present principles include systems and methods that capture instruction audio and visual events occurring in a classroom and combine these data with prior models and cognitive models of the students. In accordance with the present embodiments, a tool for assessment and professional development, called the Teaching Buddy, is provided which is based on speech and language technologies. The speech and language technologies facilitate the observation and analysis of classes in support of instructional assessment as well as teacher's professional portfolio development. From an instructional point of view, the present system is predicated on the theory that teachers develop best in a community of practice, and the Teaching Buddy is a tool that enables this community to reach deeper and more meaningful levels of analysis permitting better insights to the practitioner. From the technology point of view, the Teaching Buddy leverages automatic speech recognition (ASR) and natural language understanding (NLU) technologies with instructional discourse analysis frameworks and established instructional assessment frameworks.

To achieve this, the Teaching Buddy is structured into layers, e.g., five layers. In one embodiment, the five layers include a data capture layer, a speech recognition layer, a natural language understanding layer, an evaluation and scoring layer and a presentation layer. The results of the analysis can be used by an expert, mentor, or professional development team to provide constructive feedback to a practitioner providing substantiated justifications based on supporting evidence to identify, focus and improve. An illustrative example will demonstrate how the present system works by following an analysis process that the Teaching Buddy carries out using a brief lecture segment on Discrete Math at college level (described later).

A system to model and synthesize a virtual student is also provided that will complement and enrich the experience in the classroom in an on-line and natural fashion. The present principles provide a system that describes an active real-time participant in a classroom who proactively participates in an optimal way to complement a modeled environment. The present principles do not passively simulate a student, but model existing classroom students and synthesize stimuli in the environment to best enrich the classroom experience.

Embodiments of the present invention can take the form of an entirely hardware embodiment, an entirely software embodiment and/or an embodiment including both hardware and software elements. In a preferred embodiment, the present invention is implemented with software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The models or simulation may employ or be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GD-SII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a system 100, which may be referred to as a Teaching Buddy for ease of reference, is implemented in five components, or layers. The number of layers may be other than five, but the system 100 will be described in terms of five layers for illustrative purposes. System 100 is employed in a classroom environment or interacts with a classroom environment to gather data and make observations. The classroom environment includes any environment where instruction is provided to one or more students by an instructor. The students and instructor will be collectively referred to herein as participants. The classroom environment is preferably an interactive environment, and while the environment may include one or more persons, the environment may include or be linked with other participants through a computer network, a telephone network, a satellite link or any other technology employed to assist in interactive communications between participants.

The stages of system 100 may be employed concurrently or serially to achieve the aims in accordance with the present principles. In a first stage 102, system 100 captures and records class audio and/or video. This may include recording and/or filming/capturing the classroom activity using a video camera, an audio recording device, etc. In a second stage 104, the audio is processed and transcribed (or aligned, if human transcriptions are available) by a multi-pass automatic ASR component resulting in WAV file segmentation and word transcription hypotheses and alignments. If needed, speaker diarization and temporal-prosodic annotations can be produced in this stage 104. Such processing may include any suitable technique or techniques.

In a third stage 106, which may be referred to a natural language understanding (NLU) stage, layer or component 106, the word segments are provided as input to a natural language understanding component that clusters, annotates and classifies the classroom transcripts in, e.g., two dimensions: using an instructional discourse analysis framework and following a content framework. An instructional discourse analysis framework is a set of categories (i.e., a taxonomy) of discourse used to characterize the dialog in a classroom. For example; when the teacher says "Please close your books" the label or category is DIRECTIVE_DISCOURSE, when the teacher asks "How would you approach this problem?" the corresponding category is TRANSACTIVE_PROMPT. There are many such frameworks that may be employed.

A content framework is a model that represents the content or subject being taught in a structured manner. For example, if the class is about algebra, the structure would be representing the subtopics covered such as, variable substitution, linear systems, etc.

In a fourth stage 108, instructional assessment is conducted through an evaluation and scoring layer based on the conjectured instructional discourse and content event pattern identification. A fifth layer 110 renders and presents the results as reports. The resulting assessment reports can be used by an expert mentor to provide constructive feedback to the observed practitioner with substantiated justifications pointing to the supporting evidence.

Analysis by-products of the five stages include audio and video segments, speech transcriptions, content annotations, instructional discourse analysis framework annotations, speaker annotations, prosodic features, as well as clusters and chains of these segments and events that display recognizable patterns. While Teaching Buddy is primarily intended as a foundational block for teacher and classroom evaluation and analysis, with some minor modifications, it can leverage this rich set of by-products and, while doing so, it can also be applied as a tool for content analysis and access for the benefit of off-classroom student access to class archives. The present framework may be customized for this purpose by modifying the analysis layer 108 by simply providing class transcription, and content oriented alignment and segmentation.

By replacing the assessment stage 108 with an indexing and search component accessible via a Web interface, the application can support content search and queries. In this way, students are able to search for content and browse lectures with tags and content annotation.

Layer 102 includes data capture components. These components capture the classroom audio and visual data by situating a camera in the classroom and recording the class. In a particularly useful embodiment, the camera is focused on the teacher and blackboard. A typical class section or lecture lasting from 30 to 90 minutes provides plenty of analysis data points to cover and identify salient patterns. However, even 10 or 15 minutes of data (or less) can provide the system with a minimum of event observations to be able to compute meaningful statistics. Class data may be captured with a portable video camera using built in camera microphones. After the class, the video is transferred to a computer and the audio is extracted manually in wav format. If additional lapel-microphone recordings are available, multi-microphone ASR can be performed. Alternatively, the lapel data can be used for recognition, and an alignment between the lapel audio and the video could be performed. A lapel microphone provides less reverberation than a built-in camera microphone and is thus preferred. The resulting wav file is the input to the ASR component.

After the data capture component 102, the wav file is processed by an Automatic Speech Recognition (ASR) component 104. The core of this component 104 preferably includes a Large Vocabulary Hidden Markov Model-based continuous speech recognition engine using n-gram statistical language models (e.g., Attila) that allows the recognition of the classroom data. Other recognition techniques and engines may also be employed. In addition to transcription (recognition), other functions performed by this component 104 include energy based audio segmentation, speaker diarization, voice activity detection, time alignment and time annotations. A goal of audio segmentation in this stage is to permit the ASR engine 104 to work with segments of manageable sizes. This component 104 can also perform forced alignment in case manual transcriptions exist. This component can also benefit from class related content (books, syllabi, etc.) for recognition lexicons and n-gram models development and enhancement. The input to this component 104 is the wav file (audio) of the class and the text transcripts (if available), the output is the resulting time aligned transcripts in, for example, NIST (National Institute of Science and Technology), CTM (Conversation Time Mark), SRT (Speech Recognition Transcript) formats which are output formats of ASR engines. The units of analysis are phrases marked with time annotations and speaker tags. A typical length of these phrases is between 2 or 12 seconds and include from a few words to a few dozen words.

The NLU component 106 takes the set of CMT/SRT files (time-stamped and diarized transcriptions) and structures these into a series of utterance segments called events. Each event in the classroom (essentially an utterance or gesture) is represented by an <event/> tag instance in the XML data structure that represents the observed class. Each event tag has in its body content a transcription segment. Because not every tag necessarily has a time stamp, a new tag was created that corresponds to a time marker. The set of events tags are then annotated, which means that values are assigned to its attributes. In one embodiment, there are two attributes that attain their values in this component 106, which are equivalent to annotating the event in two dimensions. These include content labeling and classroom discourse analysis labeling.

Content labeling detects the underlying topic being discussed or taught and is preferably implemented in an N-way closed classifier. For that purpose, a vector based discriminative approach based on, e.g., Maximum Entropy, is suitable. The discourse labeling classifier attempts to identify the discourse intention and function of each segment. The classroom discourse event classification may be performed as a keyword and rule-based system. The output of component 106 is the classroom list of events with values assigned to the attributes of the tabs, in e.g., XML format.

As a result, each event tag can be perceived as an annotated document in which the annotations are the attributes of the tag. These annotations are the structured data component of the "document", while the transcription segment, included in the tag's body content, corresponds to the tag's unstructured information, or document.

The evaluation and scoring component 108 takes the annotated set of events in the form of an XML structure and identifies patterns, and computes statistics and measurements in support of assessment evaluation. There are two types of computations performed at this level. A first type of computation includes calculations of direct measurements that provide insight to what is happening in the classroom. For example, the calculations may include attribute value category distributions, frequency ratios, means and variances on underlying variables, etc. Correlations and conditional dependencies across variables can also be computed. An example of this type of statistic correlates time utilization with content topic—providing insight to what the most discussed topics in class were. In general, the structured data in the tag provides the most valuable information in the computation of these statistics.

A second type of statistic identifies distribution and event patterns that match various performance profiles. An example of this type of computation is the search and identification of patterns of time management that reflect the level of sophistication of the practitioner for this specific skill. The output of these two types of analysis is encoded in technology independent reports (i.e., XML files or structures) and is passed to a presentation and report layer 110.

The presentation layer 110 is responsible for taking the technology independent report files or data structures and rendering these in a report document or page (electronic or hard copy). The Teaching Buddy report is preferably structured into views. Each view represents a topic of analysis, in the specific case of the Continuum—a view corresponds to one Standard, and is represented in the report by a folder tab that includes a series of dashboards and charts. Each of these is called a pod. The pods represent the individual statistics and measurements, which for the Continuum maps to Standard Elements.

Each layer in the Teaching Buddy can be customized to fit different needs, not only different grade levels and subjects, but also in many other ways. For example, the ASR layer 104 can be adjusted to fit languages other than English. Layer 104 can also be adjusted to better recognize specific subjects. For example, lexicons and language models can be adapted to minimize the Out of Vocabulary rate in a specific topic (e.g., precalculus, geometry, etc). The NLU component 106 can be customized to categorize and classify specific content specific classes. Component 106 can be adjusted to perform open topic identification (as opposed to classifying from a small predefined set of topics). The instructional discourse framework and the content analysis component can be customized to fit different content areas and levels, and to consider various instructional discourse frameworks. The annotators or classifiers in the NLU component 106 can be easily exchanged as long as they all conform to the same programming interface. A framework such as an unstructured information management architecture (UIMA) can be used to better achieve this. The assessment component 108 can be adjusted to fit other assessment frameworks that better fit the needs and preferences of practitioners and coach teams. For example, the Teaching Buddy can be adjusted to implement a different assessment framework like a Danielson assessment framework.

In one example, data was analyzed as part of a one semester college freshman level course on Discrete Mathematics. The complete lecture was one hour and eight minutes long and was recorded in its entirety using a portable camera with built-in microphones.

Segment selection: The Teaching Buddy imports the data and identifies 2 subsegments representative of instructor driven instructional interaction. These are subsegment A spans from 00:11:24 to 00:30:11; subsegment B from 00:45:10 to 01:08:00, both lasting a total of 41 minutes.

Recognition, time alignment and diarization using the ASR component was performed. The selected audio is processed by the ASR stage. It is segmented, transcribed, time aligned, and speaker labeled. These 41 minutes produce a total of 369 segments, 200 student turns and 169 instructor turns. The total number of uttered words (tokens) in these segments was 5465, and the number of unique words was 595. The instructor vocabulary for this segment consisted of 510 unique words and the students' consisted of 299 unique words. The teacher's utterances consisted of 3601 uttered words and the average segment length is 20 words. The students uttered 1864 words and the average segment length was 9 words. (The transcripts were manually adjusted to optimize the ASR accuracy).

Natural Language component: Each segment is transformed into an XML <event> tag by the Teaching Buddy. Each tag then is analyzed and annotated by the instructional discourse labeler, and a topic (or content) labeler. In this example, there are 72 transactive prompts.

Evaluation component: In this layer the total teacher event distribution and time allocations were computed. Similarly student event distribution and time allocations were computed too. The system now searched for a variety of evidence and patterns that reflect the level of skill that the instructor has. In the region between events 150 and 200, the above-average density of transactive prompting combined with predictable and controlled subject discussion on a specific topic of the course, and there was broad vocabulary utilization by the students. This pattern is now found to match an expert level profile in the skill that focuses on "facilitates autonomy and student interaction".

Presentation and Report: The system can now display pie charts on students' and teacher's event distribution, time distribution, topic distribution. The system also labeled as "Innovative" the element that addressing the "Facilitates autonomy and student interaction" skill.

The presentation layer 110 has been implemented, in one example, as a Rich Internet Application (RIA) based on the Adobe Flex 3 platform which is a free Open Source framework for RIA development. Many other application development frameworks exist today; both proprietary and open source and most of them can easily be used to implement this layer.

The present principles may be extended to further employ the observational information collected by system 100. A wide array of technologies exist to support education inside the classroom: computers, projectors, smart-boards, graphic calculators as well as web-based support: wikis, discussion boards, search engines, etc. However, none of currently available technologies is intended to explicitly model and track the learning behavior of the education recipients when exposed to the educational input (e.g., lectures, discussions, assignments, readings) of the classroom. The closest form to modeling and sensing student performance is through direct assessment and testing which lacks a dynamic dimension.

In particularly useful embodiments, the problem of student learning in classrooms is addressed. The present principles explicitly sense, identify, classify, track and model student learning patterns to proactively intervene in the learning process in an optimal way to maximize the student's learning. User sensors are employed to identify learning profiles of a learning community, and the sensor data are employed to create models that represent these profiles. The system then intervenes, as a student would do, to achieve optimal classroom stimuli that maximize the overall community learning.

Figure 2:
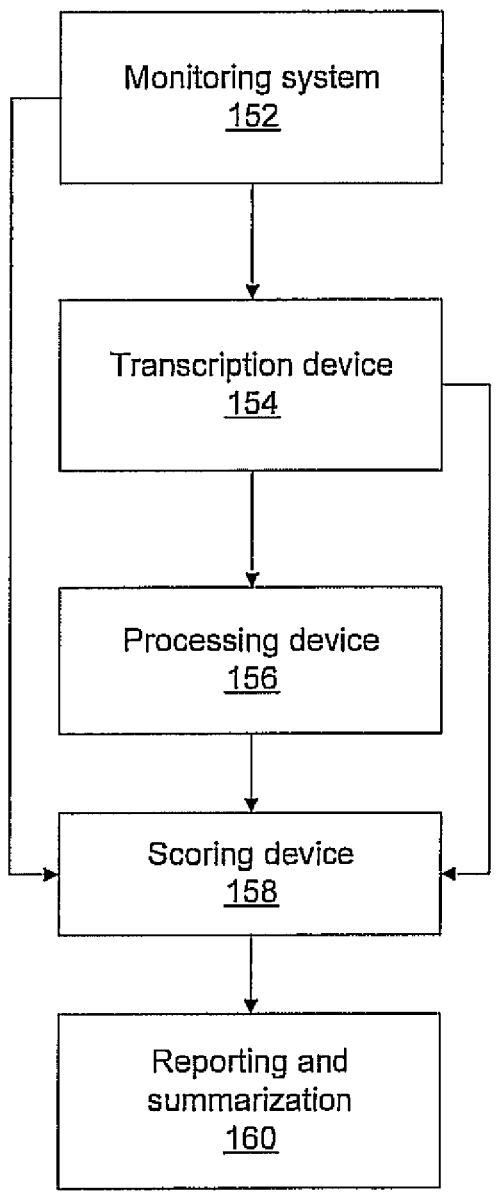
FIG. 2 is a block/flow diagram showing a Teaching Buddy System for analyzing a classroom environment in accordance with the present principles.

Referring to FIG. 2, an analysis system 150 for a classroom is illustratively depicted. System 150 includes an audio and/ or video monitoring system 152 to capture the speech and audio events (and video) coming from a teacher, the students, teacher aides, and any other classroom participant. The monitoring system 152 may include input from visual sensors and visual displays (video cameras, overhead projectors, classroom computers, graphing calculators, etc.). The monitoring system 152 may include input from classroom material (books, syllabi, teacher's notes, computer media, etc.). The monitoring system 152 may also include input from smartboards and the like.

A transcription device 154 is coupled to the audio monitoring device 152 and is capable of automatically producing transcription of words, phrases, sentences and any other speech events. The transcription device 154 may also detect and annotate biometric oriented signals, e.g., emotion, disposition, interest, etc. from classroom participants in captured video.

A processing device 156 is coupled to the transcription device 154 and is capable of automatically identifying and defining educational strategies and mechanisms (e.g., problem solving, prompting for student participation, enforcing classroom discipline, establishing educational goals, etc.) based on the transcribed data. The processing device 156 may employ public educational standards or best-practice frameworks to measure student or teacher performance.

A scoring device 158 automatically associates quality scores to each of educational strategies and mechanisms identified by the processing device 156 wherein the scores are determined at least in part on the input from the audio monitoring system 152, the transcription device 154 output, and the processing device 156 output.

A reporting and summarization mechanism 160 may be coupled to the scoring device 158, the transcription device 154 and the processing device 156 for producing at least one annotated evaluation report to the teacher based on the observed data, the identified educational strategies and the scores provided to them. The reporting and summarization mechanism 160 may output hyperlinks to specific classroom moments that influenced each specific score and/or hyperlinks to specific classroom examples from expert educators that provide examples to best practices. The reporting and summarization mechanism 160 may automatically produce comparative analyses and critiques between the practices of the evaluated teacher and examples from expert educators. The reporting and summarization mechanism 160 preferably provides feedback in real time. Other information including hyperlinks or other report structures are also contemplated.

Figure 3:
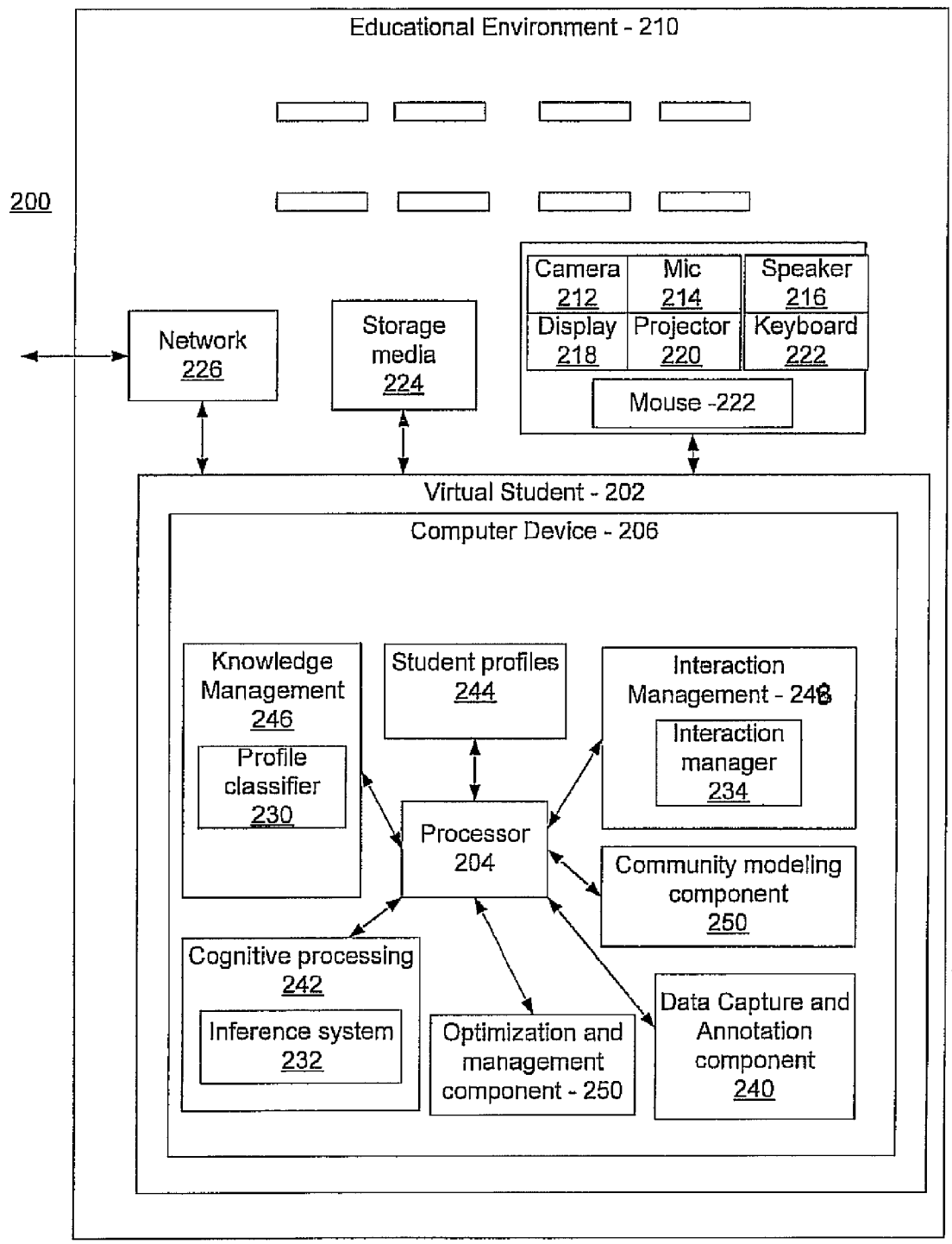
FIG. 3 is a block/flow diagram showing a system/method for having a virtual student for analyzing a classroom environment in accordance with the present principles.

Referring to FIG. 3, in particularly useful embodiments, an artificial student system 200 is employed with a goal to explicitly model and embody learning patterns of typical education recipients (i.e., students) based on the exact input that the classroom participants receive. In this way, the effectiveness of the instructional process can be improved by observing and analyzing the response of a virtual student 202 to the teaching process and input. By becoming an active participant in the learning community, the virtual student 202 can add to the learning process. Specifically, the student 202 can participate in classroom discussions, bulletin boards, can answer questions when prompted and can even raise questions.

The virtual student 202 may include a processing unit 204, which may be part of a computer device 206. The virtual student 202 preferably includes peripheral devices for interacting with and in an educational environment 210. The peripheral devices may include a camera 212, a microphone 214, speakers 216, a display 218, a projector device 220 (for displaying images or video on a screen), a keyboard 220, a mouse 222 or any other device or mechanism that permits interaction with the environment 210.

The virtual student 202 receives input from the environment 210 to analyze. For example, observed classroom data may be obtained from cameras (e.g., video cameras) 212 and microphones 214. Student's exams and homework may be directly input by students or by educational staff using the keyboard 220 and mouse 222. Teaching material, such as handouts, homework assignments, visual aids, etc. may be input using storage media 224 or downloaded over a network 226. This may also include classroom materials, such as textbooks, workbooks, on-line material and/or E-learning resources (e.g., discussion boards, etc.). The virtual student 202 may also have access to targeted communications between participants, such as emails, chats, etc. These communications may be between people in the classroom and even outside the classroom (e.g., participants joining by teleconference, by Internet, etc.).

The virtual student 202 becomes an artificial participant in a classroom. The virtual student 202 includes software programs to interpret and classify the information received. Virtual student 202 may include the components and functions of system 100 as described above. A student profile classifier 230 observes, models, and classifies or labels each student learning style, and is configured to determine what the student has learned based on homework, tests and communications by the student. For example, an archival and journal system assimilates, interweaves, indexes and cross-references all the input and events that occur in a classification. In this way, what the student has been exposed to as well as what the student has learned can be assessed. For example, the virtual student 202 logs a lecture on improper fractions. Since the teacher loaded lecture materials and the virtual student 202 is present during the actual lecture, a comparison of the material actually covered can be made. Students prepare an assignment and input the results to the virtual student 202. The virtual student 202, knowing what the students were exposed to, can determine what the students need more assistance in from the types of problems that were correct or incorrect in their assignment.

The virtual student 202 can generate a question in the class so that the teacher can answer the question in an area where a number of students may need additional assistance. In one example, an inference system 232 models student behavior to predict reactions of each student, based on a student profile, to events observed. In one instance, the student profile indicates that mathematical concepts are an area that needs further explanation for a particular student. Upon introduction of a new math topic, the inference system 232 predicts that a question should be asked regarding an unexplained topic discussed by the teacher since according to a student's profile the concept should be reinforced. The virtual student 202 includes an interaction manager 234 which includes system initiative that generates events that will guide the classroom into desired or targeted situations.

In this example, the interaction manager 234 generates a question based on the lack of explanation provided during the lecture. In other words, if the lecture were on improper fractions and the teacher neglected to mention that improper fractions can be converted to decimal form, and the lecture input by the teacher into the virtual student 202 included such a statement, then the inference system 232 would predict that a question should be asked regarding the decimal form and the interaction manager 234 would formulate and pose the question during class. This would ensure that the lecture was complete and would assist in the understanding of the topic.

The inference system 232 and the interaction manager 234 may be employed to detect situations and individual students that might need special attention, assess teacher and teaching performance, and enrich the classroom and learning. The virtual student 202 includes archival and journal functions of classroom events for student reference and for the generation of statistics. Further, the virtual student 202 may be employed to customize material for individual student needs. For example, a study sheet can be configured for individual students depending on their classroom questions or at their request.

The virtual student 202 includes a data capture and annotation component 240 to receive the inputs, transcribe speech, parse the transcribed speech and annotate the data (speech and video). These data capture and annotation steps can be integrated using an unstructured data annotation framework like UIMA. After the sentences are transcribed and parsed, the data are presented to a cognitive processing component 242 which includes the inference system 232. The goal of this component is to take the annotated data, and infer the state of the students based on the evidence observed. This means that component 242 will use a model of the classroom and the students, and will try to find the parameters that best explain the observed data. For example, the inference system 232 may sense that the state of the system is "Confusion" based on observed transcripts that reflect poor understanding from the side of the students based on the questions raised and the conversation.

From annotated data, the cognitive processing component 242 performs inferencing, problem solving, skill acquisition, scholastic aptitude, information synthesis, information analysis. These processes result in system understanding of individual students. The data captured is indexed to make the data searchable so that the virtual student 202 can recall events, correlate events and perform other tasks.

The individual students each have a student profile 244 configured to store information related to that student's behavior, goals, aptitude and successes. Student profiles 244 are stored and organized by a knowledge management component 246. The knowledge management component 246 manages and updates knowledge representations and a knowledge base. In addition to student profiles, the knowledge management component 246 manages lectures and other informational inputs to the virtual student 202. The knowledge management component 246 also performs knowledge extrapolation to assist in predicting behavior or to make comparisons between events and the information included in the knowledge base.

An interaction management component 248 includes the interaction manager 234. The interaction management component 248 generates classroom questions, answers and performs participation management in the classroom and manages E-participation. The virtual student 202 may include a community modeling component 250. This component 250 models the class as a group or community and attempts to decide events or information that should be employed to complement or supplement the learning activities. For example, the class community can be tracked to determine collective progress of the class, generate test curves, grade curves tracking, track student profiles against a collective profile to provide a comparison or achievement goal. An optimization and management component 252 provides objective or goal tracking for each student or the class as a whole. The optimization and management component 252 may also handle policy generation activities to determine or generate appropriate policies and standards for interacting with the class. For example, questions should be held to after the lecture or after requested by the teacher.

The virtual student 202 is a learning support system for a classroom that assists teaching personnel and helps ensure uniformity of education. The virtual student 202 further provides a performance rating for the teaching personnel. The system 202 captures the classroom and collaboration-oriented input that a typical student receives in real-time and provides a repository of a-priori skills that match those of a typical student or a participating student. A set of cognitive model profiles represent typical student behaviors and has access to the captured input and to the a-priori knowledge and skills. The system 202 can constantly assimilate new information from the class or from the world (e.g., news and the latest developments) and translate this information into a-priori knowledge and skills.

The system 202 models and tracks the learning community based on the input data and permits instructors to evaluate the level of learning acquired by the virtual student and hence the students in the class. Peers and instructors can interact with the virtual student (for example, a conversational interface) on their own initiative. The virtual student 202 can interact with the class or the learning community on its own initiative by calculating a best action given current events, experiences and/or collected data.

Figure 4:
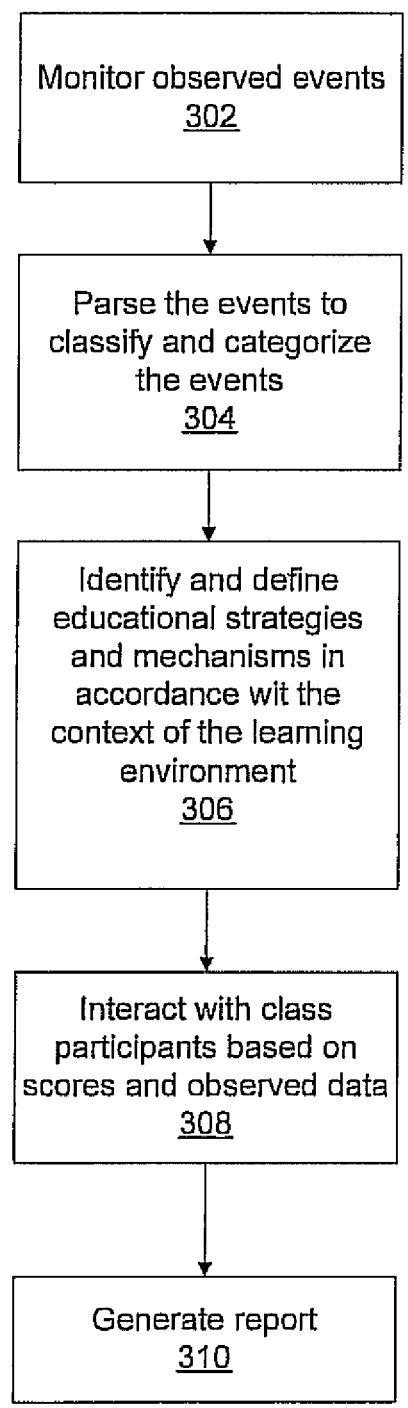
FIG. 4 is a block/flow diagram showing a system/method for analyzing a classroom environment in accordance with another embodiment.

Referring to FIG. 4, a method for analyzing classroom events is illustratively depicted in accordance with one illustrative embodiment. In block 302, observed events of participants are monitored in a learning environment. This may include the use of audio and video sensors to monitor the lecture, class discussions, questions asked, the activities of participants and the any other information pertinent to the learning process (date, time, weather, etc.). Monitoring may further include monitoring input from at least one of visual sensors and visual displays (e.g. a video camera or projector screen). Monitoring may further include inputting classroom material including at least one of books, syllabi, smartboards, lecture notes, etc.

In block 304, the observed events are parsed to classify the observed events and to understand their impact. The events and their meaning for the system are determined classified, organized and stored. Parsing may detect and annotate biometric oriented signals including at least one of emotion, disposition, and interest from classroom participants. Parsing also includes transcribing speech from classroom participants.

In block 306, educational strategies and mechanisms are identified and defined in accordance with a context of the learning environment based on the observed events. The educational strategies and mechanisms may include providing pneumonic devices, a new method of teaching subject matter, alternate explanations, additional reading materials, a reference cite, a correct spelling or pronunciation, a contrary opinion or any other strategy or mechanism. For example, if a teacher explains a concept, the teaching buddy or virtual student may signal to interrupt to give an alternate explanation or to ask a commonly asked question. Scores are computed for each of the educational strategies and mechanisms in accordance with the observed events to decide on a best or preferred action (by the teaching buddy) in the circumstances. In block 308, the system interacts with classroom participants based on the scores for the identified educational strategies and mechanisms.

In block 310, at least one annotated evaluation report may be generated based on the observed data and the scores for the identified educational strategies and mechanisms. The reporting may include providing hyperlinks to at least one of specific classroom moments that influenced each specific score and specific classroom examples from expert educators that provide examples of best practices. The reporting may also include generating a report with comparative analyses and critiques between practices of an evaluated teacher and the examples from expert educators.

Figure 5:
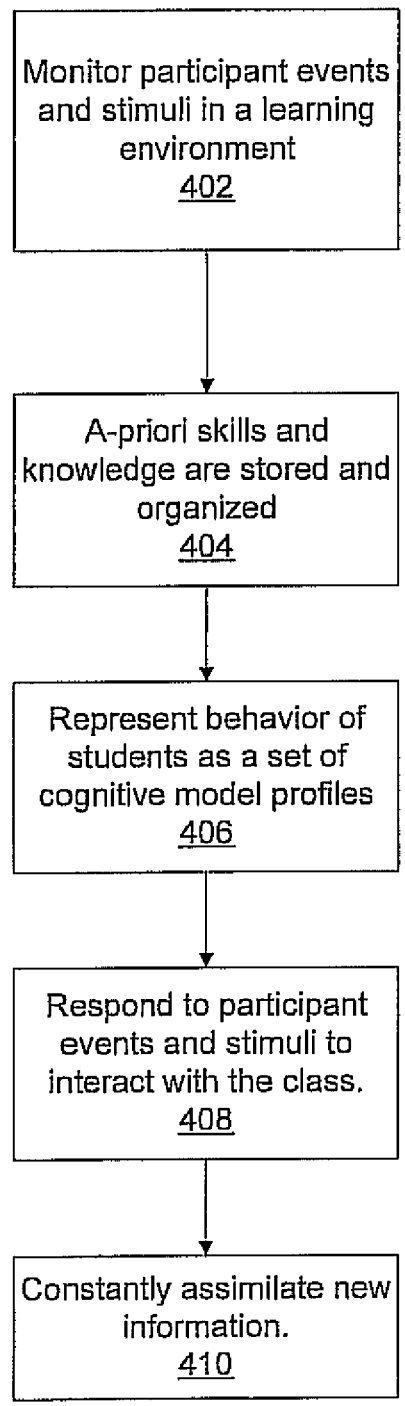
FIG. 5 is a block/flow diagram showing a system/method for analyzing a classroom environment using a virtual student in accordance with the present principles.

Referring to FIG. 5, a method for providing learning support for a classroom is illustratively depicted. In block 402, real-time participant events and stimuli are monitored in a learning environment using sensing devices. The participant events include classroom and collaboration-oriented input. Classroom and collaboration-oriented input may include classroom speech activities, emotions, interest, information described or used in class (books, syllabi, notes, projection displays, etc.), downloaded, content, conference in students or teachers, web sites, etc.

In block 404, a-priori skills of a typical student and a-priori knowledge of participating students are stored and organized. A-priori skills of a typical student may be the abilities of a typical student of a specific age and learning capacity. These may include skills like working with others, abstract reasoning, speech level, reading level, etc. A-priori knowledge of participating students may be stored in a profile for that student and provides an educational history of that student. This may also include the grade and achievement for that student.

In block 406, participant student behaviors are represented as a set of cognitive model profiles stored in system memory. The model profiles incorporate the captured participant events, the stimuli and the a-priori knowledge and skills. The set of cognitive model profiles are employed to infer an action of a participant to perform an interactive task based upon an inference. In block 408, the system responds to the participant events and stimuli to perform interactive tasks during a class session. The interactive tasks may include at least one of posing a question, supplementing a lecture, tracking progress, rating teacher performance, among other things. The system's interaction manager can select a best action based on one of standards and policies to respond to the participant events and stimuli.

In block 410, new information is constantly assimilated into a-priori knowledge and skills. With each new experience or each new event, the knowledge base of the system grows and more details are attributed to the students. The system models and tracks participants based on the real-time participant events and stimuli. The system permits an instructor to evaluate a level of learning acquired by students using the a-priori skills and knowledge collected by the system. The system provides a conversational interface wherein the system and participants interact on their own initiative.

Having described preferred embodiments of a system and method for improving the quality of teaching through analysis using a virtual teaching device (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An analysis system for a classroom, comprising:
a monitoring device configured to capture audio events of classroom participants comprising at least one teacher participant and student participant in a learning environment;
a transcription device coupled to the monitoring device to transcribe speech dialogue of the classroom participants in the audio events;
a processing device coupled to the transcription device to identify and classify at least the transcribed speech dialogue and to define educational strategies and mechanisms selected from the group consisting of problem solving, prompting for student participant, enforcing classroom discipline and establishing educational goals, in accordance with a context of the learning environment based on at least the transcribed speech dialogue, wherein scores are computed for each of the educational strategies and mechanisms in a accordance with observed audio events and processed to decide on a preferred action in the learning environment, wherein the scores are determined based on at least one of input from the monitoring system, output of the transcription device and output of the processing device; and
a reporting mechanism configured to produce at least one annotated evaluation report based on observed data, the scores for the identified educational strategies and mechanisms to the at least one teacher participant.

2. The analysis system as recited in claim 1, wherein the report includes at least one of hyperlinks to specific classroom moments that influenced each specific score and hyperlinks to specific classroom examples from expert educators that provide examples of best practices.

3. The analysis system as recited in claim 2, wherein the report includes comparative analyses and critiques between practices of an evaluated teacher participant and the examples from expert educators.

4. The analysis system as recited in claim 1, wherein the monitoring system includes input from at least one of visual sensors and visual displays.

5. The analysis system as recited in claim 1, wherein the monitoring system includes input from classroom material including at least one of books, syllabi, smartboards and lecture notes.

6. The analysis system as recited in claim 1, wherein the transcription device detects and annotates biometric oriented signals including at least one of emotion, disposition, and interest from classroom participants.

7. A method for analyzing classroom events, comprising:
monitoring observed events including at least audio events of classroom participants comprising at least one teacher participant and student participant in a learning environment using a sensor device;
parsing and transcribing the observed events and audio events comprising speech dialogue of the classroom participants to classify the observed events, to understand their impact and to characterize the observed events and audio events;
identifying and defining educational strategies and mechanisms selected from the group consisting of problem solving, prompting for student participation, enforcing classroom discipline and establishing educational goals, in accordance with a context of the learning environment based on the observed events and audio events including speech dialogue of the classroom participants, wherein scores are computed for each of the educational strategies and mechanisms in accordance with the observed events and the transcribed speech dialogue and processed to decide on a preferred action in the learning environment; and
interacting with the classroom participants based on the scores for the identified educational strategies and mechanisms.

8. The method as recited in claim 7, further comprising reporting at least one annotated evaluation report based on observed data, and the scores for the identified educational strategies and mechanisms.

9. The method as recited in claim 8, wherein reporting includes providing hyperlinks to at least one of specific classroom moments that influenced each specific score and specific classroom examples from expert educators that provide examples of best practices.

10. The method as recited in claim 9, wherein reporting includes generating a report with comparative analyses and critiques between practices of an evaluated teacher participant and the examples from expert educators.

11. The method as recited in claim 7, wherein monitoring further includes monitoring input from at least one of visual sensors and visual displays.

12. The method as recited in claim 7, wherein monitoring further includes inputting classroom material including at least one of books, syllabi, smartboards and lecture notes.

13. The method as recited in claim 7, wherein parsing detects and annotates biometric oriented signals including at least one of emotion, disposition, and interest from classroom participants.

14. The method as recited in claim 7, wherein parsing transcribes speech from the classroom participants.

15. A computer readable medium comprising a computer readable program, wherein the computer readable program when executed on a computer causes the computer to perform the steps of claim 7.

* * * * *